F. Davison,
Lathe Chuck,

Nº 75,872.

Patented Mar. 24. 1868.

Witnesses.

F. Davison

United States Patent Office.

F. DAVISON, OF RICHMOND, VIRGINIA.

Letters Patent No. 75,872, dated March 24, 1868.

IMPROVEMENT IN LATHE-CHUCKS.

The Schedule referred to in these Letters Patent and making part of the same.

TO ALL WHOM IT MAY CONCERN:

Be it known that I, F. DAVISON, of Richmond, in the county of Henrico, and State of Virginia, have invented a new and useful Improvement in Chucks; and I do hereby declare that the following is a full, clear, and exact description of the same, reference being had to the accompanying drawings, making a portion of this specification, in which—

Similar letters of reference indicate corresponding parts in both figures.

This invention consists in a shell, furnished with appropriate holding-jaws, a slotted disk or face-plate, and a tightening-screw, so combined that the chuck may be employed with very great convenience, either for eccentric or concentric turning, as occasion may require.

To enable others to understand the construction and operation of my invention, I will proceed to describe it with reference to the drawings.

Figure 1:
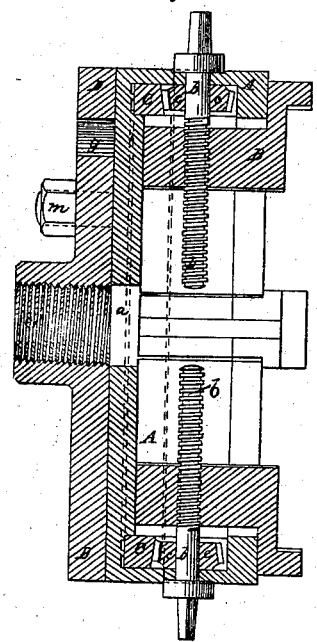
Figure 1 is a transverse section of a chuck made according to my invention.
Figure 2:
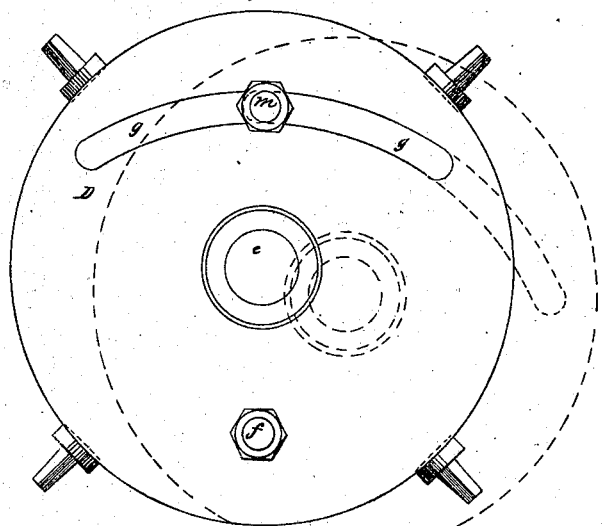
Figure 2 is a back view of the same.

A represents a circular shell, provided with a central opening at $a$, and having radial guides or recesses formed in it, in which are situated the sliding holding-jaws B, the outer ends of which project beyond the front surface of the shell, as shown in fig. 1, passing inward through the circular sides of the shell. In positions radial to the axis of such shell are screws $b$, which pass through female screws provided in the jaws B, and are each furnished with a bevel-pinion, $c$, which gears with a bevel or toothed rim, C, situated in a suitable annular guide at the inner part of the shell, as indicated in fig. 1, in such manner that, by turning one of the screws $b$ in one direction or the other, by means of a wrench, or other suitable means applied to its head or outer extremity, it will not only move inward or outward, as the case may be, the holding-jaw B, through which it is passed, but also, by means of the pinions $c$ and rim C, will operate the remaining screws $b$, to simultaneously move the other jaws in a corresponding direction, either to hold the article held between the concentric jaws, or to release it therefrom, as occasion may require. Shown at D is a disk or face-plate, formed with a central female screw at $e$, whereby it may be attached to the mandrel of the lathe. The shell A is pivoted by a pivot, $f$. To the front of this face-plate, at a greater or less distance from the centre of the face-plate, as represented in the figures, and formed in the opposite side of the face-plate, is an arc-shaped slot, $g$, concentric to the pivot $f$, and through which is passed a broad-headed screw, $m$, which screws into the back of the shell A in such manner that, by turning the screw to tighten the head thereof against those portions of the disk adjacent to the slot $m$, the shell will be firmly held to the face-plate, either in a position corresponding with that of the disk, or eccentric thereto, as indicated by the red outline in fig. 2, the slot $m$ enabling the shell to be adjusted with its centre at any desired distance from that of the face-plate, so that any desired degree of eccentricity of the holding-jaws of the shell, with reference to the centre of the face-plate, or, in other words, with the axis of motion of the chuck, when the chuck is used, may be secured, this adjustability of the shell, which carries the holding-jaws upon the face-plate, fitting the chuck for use either in concentric or eccentric turning, as may be required.

What I claim as my invention, and desire to secure by Letters Patent, is—

The combination of the pivoted shell, provided with holding-jaws, the slotted disk or face-plate, and the tightening-screw, substantially as and for the purpose specified.

F. DAVISON.

Witnesses:
J. PENNELL,
T. D. ALLEN.